(12) United States Patent
Joergensen

(10) Patent No.: US 10,161,598 B2
(45) Date of Patent: Dec. 25, 2018

(54) LIGHT FIXTURE COMPRISING LIGHT SOURCES, LENSLETS AND A RETRO-REFLECTOR

(71) Applicant: Martin Professional ApS, Aarhus N (DK)

(72) Inventor: Dennis Thykjaer Joergensen, Roende (DK)

(73) Assignee: Martin Professional APS, Aarhus N (DK)

( * ) Notice: Subject to any disclaimer, the term of this patent is extended or adjusted under 35 U.S.C. 154(b) by 0 days.

(21) Appl. No.: 15/695,352

(22) Filed: Sep. 5, 2017

(65) Prior Publication Data

US 2018/0066827 A1 Mar. 8, 2018

(30) Foreign Application Priority Data

Sep. 4, 2016 (DK) .................................. 201670676

(51) Int. Cl.
*F21V 3/00* (2015.01)
*F21V 5/00* (2018.01)
(Continued)

(52) U.S. Cl.
CPC ................ *F21V 13/14* (2013.01); *F21K 9/62* (2016.08); *F21K 9/64* (2016.08); *F21V 5/007* (2013.01); *F21V 7/045* (2013.01); *F21V 13/04* (2013.01); *F21V 14/06* (2013.01); *F21V 14/08* (2013.01); *G02B 19/0066* (2013.01);
(Continued)

(58) Field of Classification Search
CPC ... F21K 9/62; F21K 9/64; F21V 5/007; F21V 5/008; F21V 7/0058; F21V 7/045; F21V 7/048; F21V 7/22; F21V 7/24; F21V 13/04; F21V 13/06; F21V 13/08; F21V 13/14;
(Continued)

(56) References Cited

U.S. PATENT DOCUMENTS

| 5,309,277 | A | 5/1994 | Deck |
| 5,402,326 | A | 3/1995 | Belliveau |
| 6,227,669 | B1 | 5/2001 | Tiao et al. |
| 6,402,347 | B1 | 6/2002 | Maas et al. |
| 6,443,594 | B1 | 9/2002 | Marshall et al. |

(Continued)

FOREIGN PATENT DOCUMENTS

| EP | 1710493 A2 | 10/2006 |
| EP | 2881650 A1 | 6/2015 |
| EP | 2881651 A1 | 6/2015 |
| EP | 2881652 A1 | 6/2015 |
| EP | 2881653 A1 | 6/2015 |

(Continued)

OTHER PUBLICATIONS

Yen et al., "Phosphor Handbook", CRC Press, Taylor & Francis Group, 2007, 1056 pages.

*Primary Examiner* — Jason M Han
(74) *Attorney, Agent, or Firm* — Brooks Kushman P.C.

(57) ABSTRACT

An illumination device comprising a plurality of light sources emitting light along an optical axis, the light sources comprises a converting material capable of converting light into other wave lengths. An optical gate is arranged along the optical axis and a light collector is arranged between the light sources and the optical gate. The light collector comprises a plurality of lenslets adapted to collect light and to convert the collected light into a plurality of light propagate through the optical gate. An optical projecting system collects and projects at a part the light beams along the optical axis. A retro-reflector is arranged between the light collector (Continued)

and the plurality of light sources and is configured to reflect at least a part light back to the converting material of at least one of the light sources.

14 Claims, 8 Drawing Sheets

(51) Int. Cl.
    *F21V 13/14*      (2006.01)
    *F21K 9/64*      (2016.01)
    *F21V 7/04*      (2006.01)
    *F21V 14/06*      (2006.01)
    *F21V 14/08*      (2006.01)
    *G02B 19/00*      (2006.01)
    *F21V 13/04*      (2006.01)
    *G03B 21/20*      (2006.01)
    *F21K 9/62*      (2016.01)
    *F21Y 115/10*      (2016.01)
    *F21W 131/406*      (2006.01)

(52) U.S. Cl.
    CPC ... *G03B 21/2066* (2013.01); *F21W 2131/406* (2013.01); *F21Y 2115/10* (2016.08)

(58) Field of Classification Search
    CPC ......... F21W 2131/406; G02B 19/0066; G03B 21/2066

USPC ........................................ 362/249.02, 311.02
See application file for complete search history.

(56) References Cited

U.S. PATENT DOCUMENTS

| | | | |
|---|---|---|---|
| 6,601,973 | B2 | 8/2003 | Rasmussen et al. |
| 6,687,063 | B1 | 2/2004 | Rasmussen et al. |
| 7,226,185 | B2 | 6/2007 | Dolgin et al. |
| 2004/0233664 | A1 | 11/2004 | Beeson et al. |
| 2009/0122548 | A1 | 5/2009 | Dalsgaard |
| 2013/0027442 | A1 | 1/2013 | Joergensen |
| 2014/0078730 | A1 | 3/2014 | Li |
| 2015/0215569 | A1 | 7/2015 | Li |

FOREIGN PATENT DOCUMENTS

| | | |
|---|---|---|
| JP | 2006269182 A | 10/2006 |
| WO | 0198706 A1 | 12/2001 |
| WO | 2006023180 A1 | 3/2006 |
| WO | 2009020484 A1 | 2/2009 |
| WO | 2010145658 A1 | 12/2010 |
| WO | 2011076213 A1 | 6/2011 |
| WO | 2011076219 A1 | 6/2011 |
| WO | 2014014605 A2 | 1/2014 |

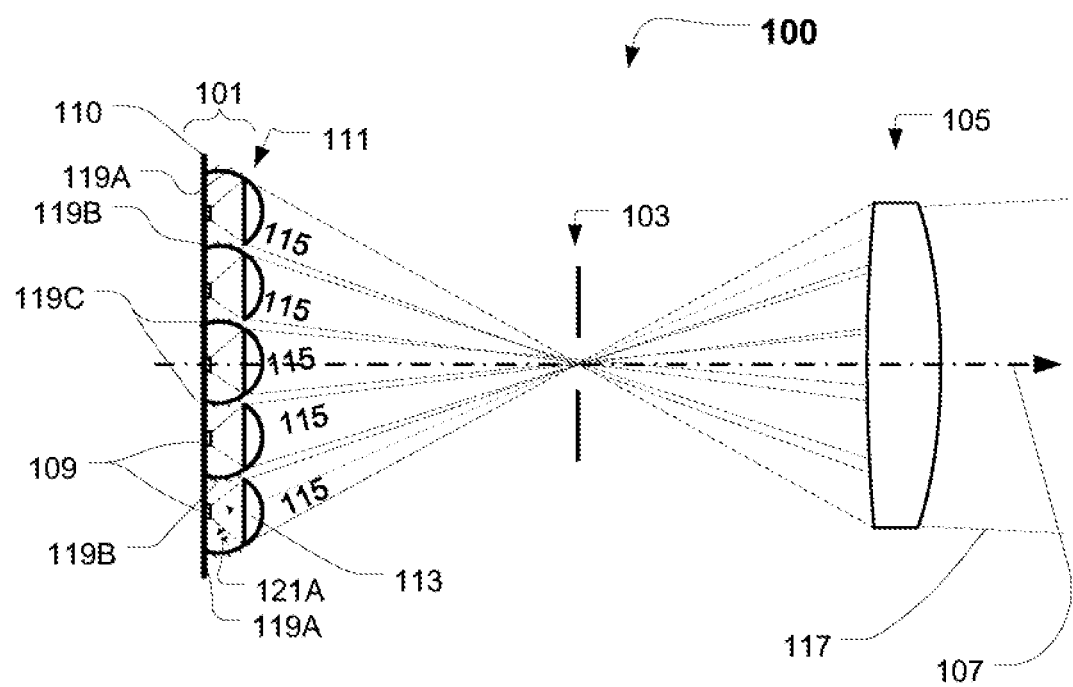
Fig. 1A
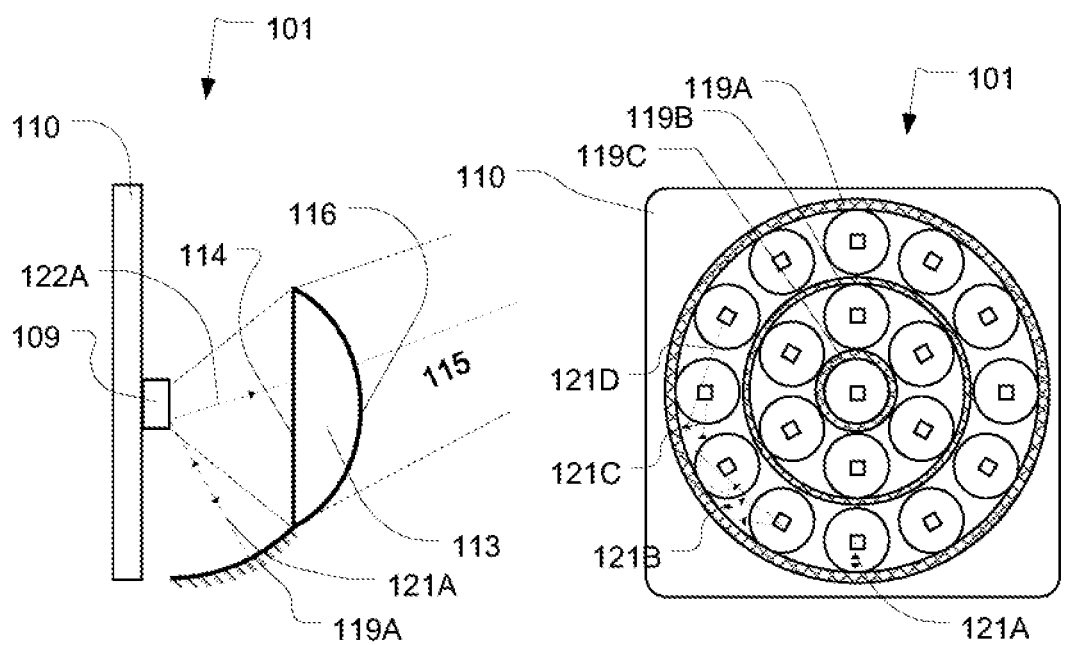
Fig. 1B
Fig. 1C

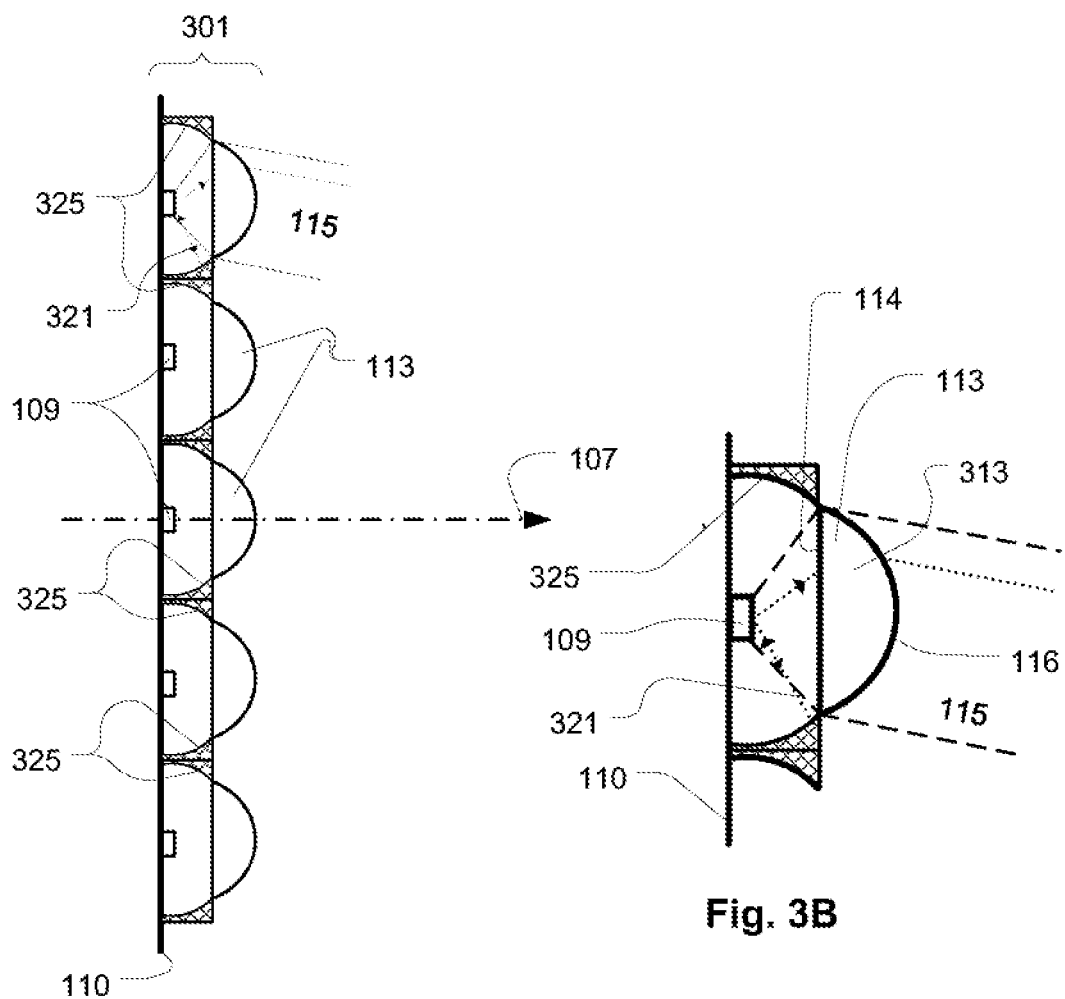
Fig. 3A
Fig. 3B
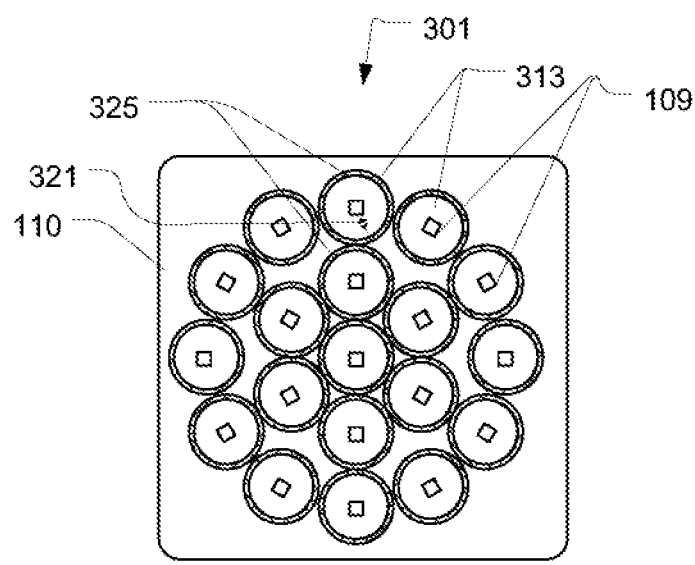
Fig. 3C

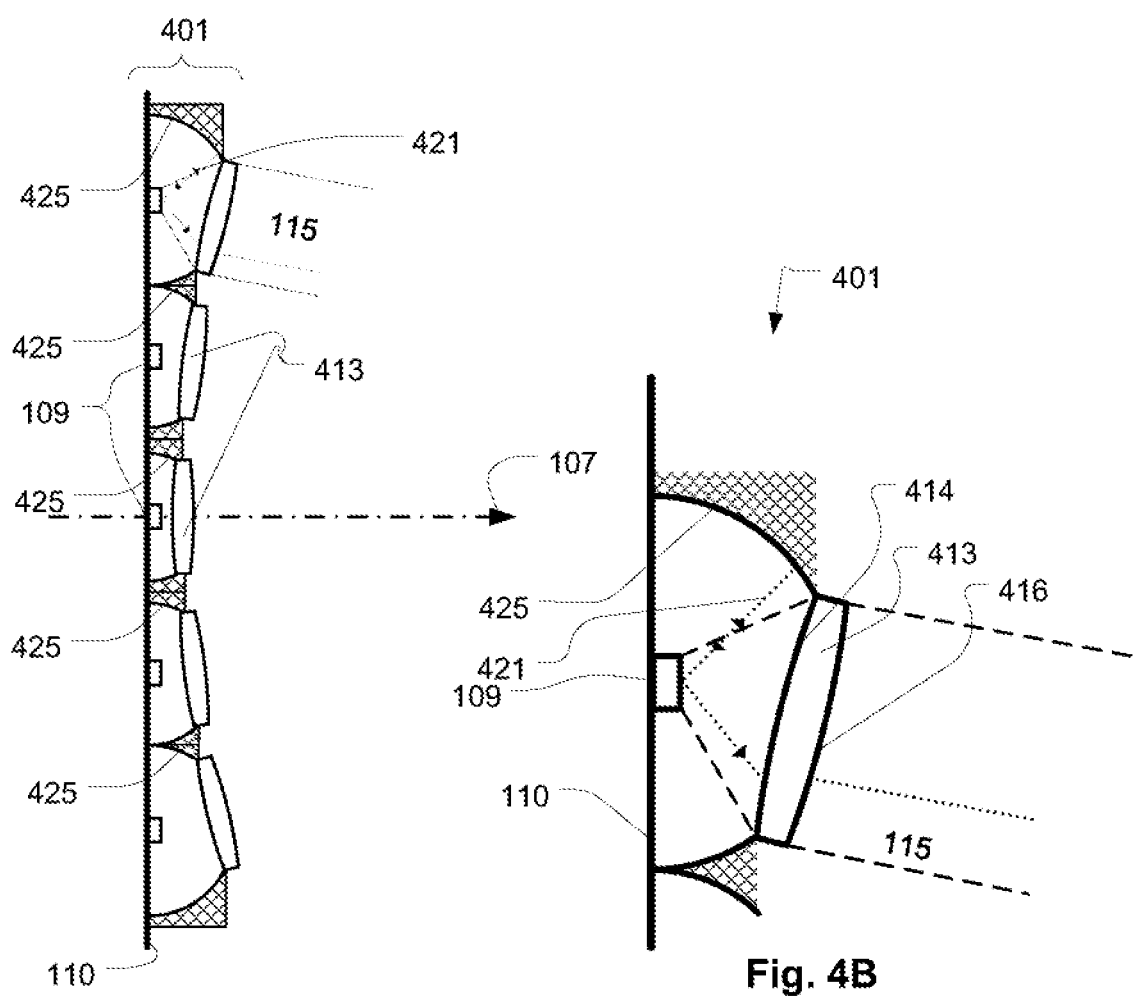
Fig. 4B
Fig. 4A
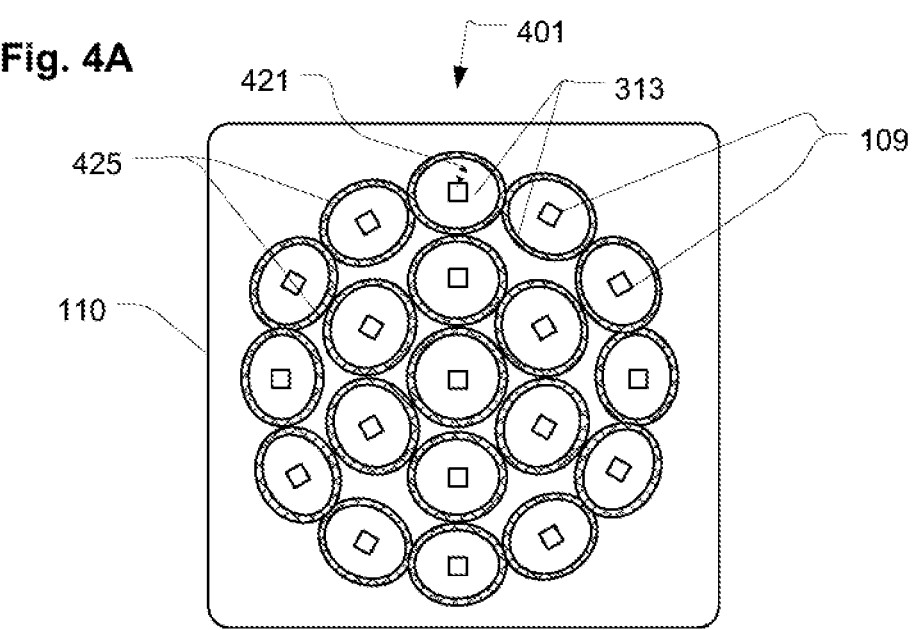
Fig. 4C

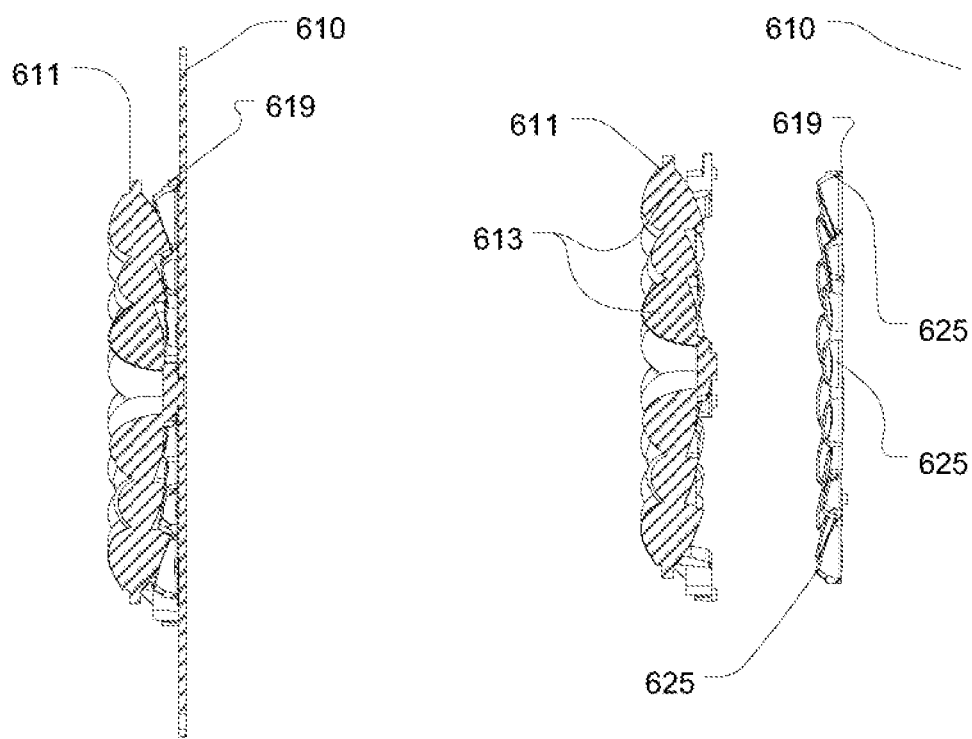
Fig.6E                    Fig.6F
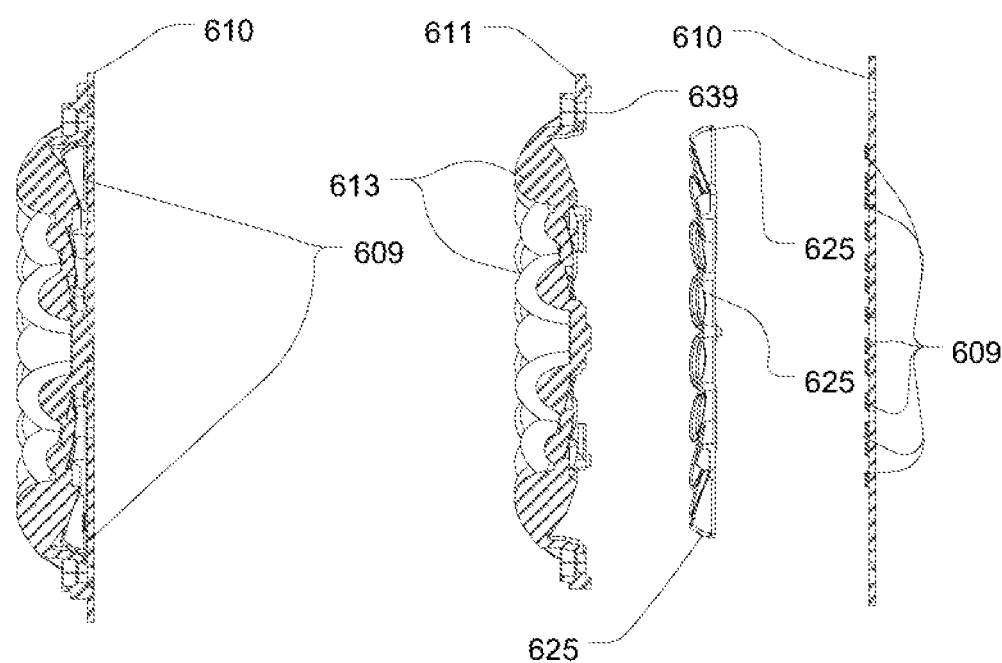
Fig.6G                    Fig.6H

LIGHT FIXTURE COMPRISING LIGHT SOURCES, LENSLETS AND A RETRO-REFLECTOR

CROSS-REFERENCE TO RELATED APPLICATIONS

This application claims foreign priority benefits under 35 U.S.C. § 119(a)-(d) to DK Application Serial No. PA201670676, filed Sep. 4, 2016, the disclosure of which is hereby incorporated in its entirety by reference herein.

TECHNICAL FIELD

The invention relates to projecting light fixtures comprising a plurality of light sources generating light emitted through an optical gate and where an optical projecting system projects the light along an optical axis.

BACKGROUND

In order to create various light effects and mood lighting in connection with concerts, live shows, TV shows, sport events or as a part of an architectural installation light fixtures creating various effects are getting more and more use in the entertainment industry. Typically, entertainment light fixtures create a light beam having a beam width and a divergence and can for instance be wash/flood fixtures that create a relatively wide light beam with a broad light distribution, profile fixtures adapted to project images onto a target surface, or hybrid/beam fixtures capable of creating sharp light beam for mid-air light effects.

Light emitting diodes (LED) are becoming more and more used in connection with lighting applications due to their relatively high efficiency, low energy consumption, long lifetime, and/or capability of electronic dimming. Presently, LEDs are used in both wash/flood, projecting and hybrid light fixtures.

In general, it is desired to have a multi-colored LED lighting product with a high lumen output and also a high Color Rendering Index (CRI). However, this is hard to achieve when using LEDs in a light fixture where the light is coupled through an optical gate. Due to Etendue limitations, it is not possible to combine light from an unlimited amount of light sources into a light beam which is coupled through an optical gate. This is the case in connection with projecting light fixtures where an image creating objects (GOBO) is positioned in or close to the optical gate and where an optical projecting system collects the light from the optical gate and is adapted to image the optical gate (and thus also the image creating object) at a target surface. The light beam is very narrow when it passes the optical gate and such projecting systems are thus limited by Etendue. The Etendue (i.e., as defined by the following equation, $E=A*\Omega$) at the gate through which light is emitted has a limited opening area A and the imaging optics only collect light from a limited solid angle $\Omega$. For light sources, the Etendue can be calculated in the same way, where A is the radiating area, and $\Omega$ is the solid angle it radiates light into.

In addition to high lumen output and high CRI, it is also desired to have very compact illumination devices, which is difficult to achieve when more light sources are being integrated into the same illumination device.

In projecting light fixtures, the light is generally collected into an optical gate where the image is generated, and an imaging optical system projects the gate onto a target surface. WO0198706, U.S. Pat. No. 6,227,669 and U.S. Pat. No. 6,402,347 disclose lighting systems comprising a number of LEDs arranged in a plane array where a converging lens is positioned in front of the LED in order to focus the light, for instance, to illuminate a predetermined area/gate or for coupling the light from the diodes into an optical fiber.

U.S. Pat. No. 5,309,277, U.S. Pat. No. 6,227,669, WO0198706, JP2006269182 A2, EP1710493 A2, and U.S. Pat. No. 6,443,594 disclose lighting systems where the light from a number of LEDs is directed towards a common focal point or focusing area, for instance, by tilting the LEDs in relation to the optical axis (JP2006269182 A2, WO0198706, and U.S. Pat. No. 5,309,277) or by using individually refracting means positioned in front of each LED (U.S. Pat. No. 6,443,594, U.S. Pat. No. 7,226,185B, and EP1710493).

WO06023180 discloses a projecting system comprising a LED array with a multiple number of LEDs where the light from the LEDs is directed towards a target area. The LEDs may be mounted to a surface of a curved base.

The prior art fixtures try to increase the lumen output by adding as many light sources as possible. The consequence is, however, that the efficiency with regard to power consumption versus light output is very low, as it is fundamentally only possible to effectively utilize light sources of same or less Etendue as the imaging optics in this kind of optical system. If the source Etendue is a close match to the Etendue of the imaging system, there are no gains in using multiple sources in order to increase the light output (intensity/lumen) as the Etendue of the light sources then will be larger than the Etendue of the imaging system and the imaging system is thus not capable of collecting the light.

WO11076213 and WO11076219 disclose an illumination device comprising a light source module generation light, an aperture delimiting the optical gate and a projecting system adapted to image the optical gate at a target surface. The light source module comprises a number of light sources and a number of light collecting means. The light collecting means comprise a central lens aligned along and a peripheral lens at least partially surrounding the central lens. The central lens collects and converts a first part of the light from the light source and images the light source between the aperture the projecting system. The peripheral lens part collects and converts a second part of the light from the light source and is adapted to concentrate the second part of the light at the aperture. The light source module comprises a cooling module comprising a number of interconnected plane mounting surfaces angled in relation to each other and where the light sources is arranged on the plane mounting surfaces. The cooling module comprises a first side comprising the mounting surfaces and a second side comprising a number of cooling fins defining a number of radial air channels.

Even though the illumination device as disclosed in WO11076213 and WO11076219 is very effective, it has some disadvantages as it is relatively expensive to manufacture as the LEDs and TIR lenses needs to be arranged individually.

EP2881650, EP2881651, EP2881652, and EP2881653 disclose illumination devices comprising a plurality of light sources emitting light, an optical gate; a light collector arranged between the light sources and optical gate and an optical projecting system adapted to image the optical gate at a distance along the optical axis. The light collector is adapted to collect light from a plurality of light sources and the light collector comprises a plurality of lenslets collecting light from the light sources and converting the light into a plurality of light beams propagating along an optical axis. The lenslets can be arranged in a dense pattern, where a plurality of outermost adjacent lenslets is located along an outer circular boundary having the same radial distance to a center of the light collector. The dense pattern can been obtained by optimizing a packaging density defined by a ratio of a sum of areas of circular cross sections of the lenslets and an area of the outer circular boundary. The dense pattern comprises adjacent lenslets, where the lenslets of at least some of the pairs of the adjacent lenslets have different optical power and wherein the exit surfaces of the pairs of the adjacent lenslets having different optical power meet along a boundary. The axial distances between the lenslets and light sources along the optical axis for adjacent lenslets are different for at least some of the adjacent lenslets. There is a desire to increase the light output of a illumination devices disclosed by EP2881650, EP2881651, EP2881652, and EP2881653. Additionally some phosphor based LED's have an uneven color distribution across the emitting surface, mainly due to variation in phosphor thickness and as a consequence the illumination at the optical gate provided be the systems disclosed by EP2881650, EP2881651, EP2881652, and EP2881653 may vary from protest to product.

SUMMARY

The object of the present invention is to solve the above described limitations related to prior art or other problems of the prior art. This is achieved by an illumination device, method and entertainment light fixture as described in the independent claims. The dependent claims describe possible embodiments of the present invention. The advantages and benefits of the present invention are described in the detailed description of the invention.

BRIEF DESCRIPTION OF THE DRAWINGS

Embodiments of the invention will be described, by way of example only, with reference to the drawings, in which FIGS. 1A-1C illustrate an illumination device comprising a plurality of light sources, a light collector and a retro-reflector;

FIGS. 3A-C illustrate another embodiment of a light source module usable for the illumination device of FIG. 1;

FIGS. 4A-C illustrate another embodiment of a light source module usable for the illumination device of FIG. 1;

FIGS. 6A-6H illustrate the light source module of the entertainment light fixture illustrate in FIG. 5A-5B.

DETAILED DESCRIPTION

Figure 2:
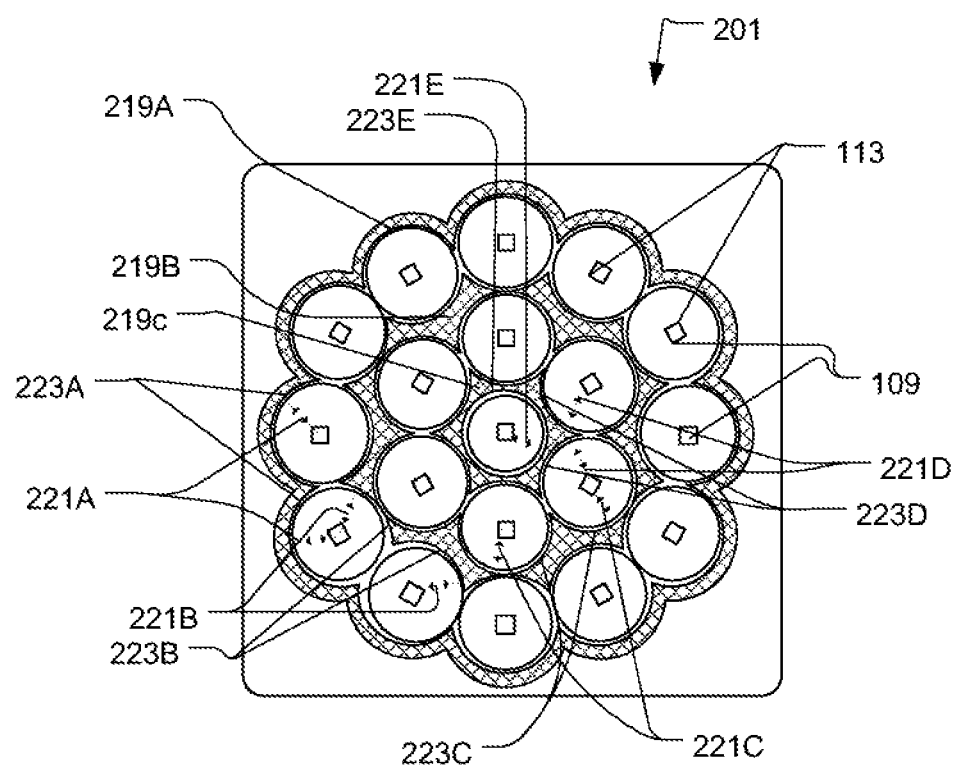
FIG. 2 illustrates a front view of another embodiment of a light source module usable for the illumination device of FIG. 1.

The present invention is described in view of exemplary embodiments only intended to illustrate the principles of the present invention. The skilled person will be able to provide several embodiments within the scope of the claims. In the illustrated embodiments, the illustrated light beams and optical components do only serve to illustrate the principles of the invention rather than illustrating exact and precise light beams and optical components. Throughout the description, the reference numbers of similar elements providing similar effects have the same last two digits. Further it is to be understood that in the case that an embodiment comprises a plurality of the same features then only some of the features may be labeled by a reference number.

FIGS. 1A-1C illustrate an exemplary embodiment of an illumination device according to the present invention, where FIG. 1A illustrates a structural cross sectional view; FIG. 1B illustrates an enlarged view of the bottommost lenslet; FIG. 1C illustrates a front view (seen from the optical gate) of the light source module 101. The illumination device 100 comprises a light source module 101, an optical gate 103, and an optical projecting system 105 arranged along an optical axis 107.

The light source module 101 comprises a plurality of light sources 109 (illustrated as white quadrangles) and a light collector 111 arranged between the plurality of light sources 109 and the optical gate 103. The light sources 109 may be arranged on a mounting element 110 such as a printed circuit board (PCB) and/or a mounting plate. However, it is to be understood that the light source can be arranged in many different ways. The light collector 111 comprises a plurality of lenslets 113 where each lenslet is configured to collect light from the light sources 107 and to convert the collected light into a plurality of light beams 115 as illustrated by dashed lines, so that the light beams propagate along the optical axis and through the optical gate 103. Each lenslet 113 comprises an entrance surface 114 where the light enters the lenslet and an exit surface 116 where the light exits the lenslet 113. The lenslets 113 can be formed as any kind of optical lenses in any optical transparent material such as glass or polymers. The shape of the entrance surface 114 and exit surface 116 can be designed according to desired optical properties of the light beams. The lenslets 113 may be configured to fill the optical gate 103 with light from the light sources 109 so that the area, i.e., the aperture of the optical gate 103 is illuminated with a uniform intensity and/or optimized for max light output. The optical gate 103 may be formed as an aperture where the light can pass therethrough, however, the skilled person will realize that the optical gate in general describes a position along the optical axis where the light is concentrated. As a consequence, the skilled person will realize that the aperture may be omitted and that the optical gate 103 in such an embodiment refers to a position along the optical gate 103 where light is concentrated. Additionally, the optical gate 103 can be formed to be a light modifying object such as GOBOs or other image generating object.

The optical projecting system 105 is arranged after the optical gate 103 along the optical axis 107 and is configured to collect at least a part of the light beams transmitted through the optical gate 103 and to project at least a part of the collected light along the optical axis 107 as indicated by light beam 117. The optical projecting system 105 can comprise one or more optical lenses, reflectors and/or any other optical components. The optical components of the optical projecting system can be fixed in relation to each other and/or be moveable in relation to each other for instance in order to provide zoom effect and/or focus effects to the light beam as known in the art of entertainment lighting. The optical projecting system 105 may also be configured to image the optical gate 103 at a distance along the optical axis 107. For example, the optical projecting system 105 may be configured to image the optical gate 103 onto some object such as a screen, e.g., a screen on a concert stage. A certain image, e.g., some opaque pattern provided on a transparent window, an open pattern in a non-transparent material, or imaging object such as GOBOs known in the field of entertainment lighting, may be contained within the gate 103 so that that the illuminated image can be imaged by the optical projecting system 105. Accordingly, the illumination device 100 may be used for entertainment lighting.

The light sources 109 are provided as light converting light sources such as phosphor based LEDs, where pumping light from a number of pumping light sources are converted into light having other wavelengths by illuminating a converting material with the pumping light. Generally, this technique is known as luminescence where the converting material is excited by photons from the pumping light and thereafter decay while emitting photons having other wavelengths. The converting material can be any material cable of being excited by electromagnetic radiation for instance electromagnetic radiation in the optical region which comprises infrared (IR) light, visible light and ultra-violet (UV) light. The light converting material can for instance be phosphor materials as known in the prior art and for instance as described in "Phosphor Handbook", second edition; edited by William M. Yen, Shigeo Shionoya, Hajime Yamamoto; CRC Press, Taylor & Francis Group 2007; ISBN: 0-8493-3564-7. The light converting material can also be quantum dots. The light sources 109 creating the pumping light can be provided as any kind of light source capable of generating light suitable for pumping the converting material, for instance light emitting diodes (LEDs), discharge lamps, OLEDs, PLED's, plasma sources, filament lamps, fluorescent light sources, phosphor based light sources, or other suitable light sources. The light source 109 may comprise one or more light source units, for example two or more light source units emitting different colors. For example, a light source 109 may be provided as a multi-die LED comprising a plurality of LED dies emitting different colors for instance red, green and blue dies (known as a 3 in 1 RGB LEDs) or may comprise red, green, blue and white dies (known as a 4 in 1 RGBW LEDs).

The light sources 109 may be phosphor based LEDs where an LED emits light having short wavelengths (typical in the UV and/or blue region) and where a part of the light is converted into light having shorter wavelengths (typical in the green to red regions) by illuminating a converting material with the shortwave light.

The illumination device 100 comprises at least one retro reflector 119A, 119B, 119C (or 119) arranged between the light collector 111 and the light sources 109. The retro reflector 119 is configured to receive at least a part of the light emitted by the light source 109 and is configured to reflect at least a part of the received light back towards the converting material of one of the light sources 109 as illustrated by dotted lines 121A, 121B, 121C, 121D. For the sake of simplicity only four exemplary light rays lines 121A, 121B, 121C, 121D have been illustrated in FIG. 1C and light ray 121A have also been illustrated in FIGS. 1A and 1B. The skilled person will realize that more light rays are present. This setup makes it possible to increase the overall light output of the illumination device 100, as the retro-reflector 119 can be configured such that the light back reflected towards the light source 109 will hit the converting material of the light sources and the converting material will scatter the back reflected light. As a consequence, some of the back reflected light will thus be directed in the forward direction as illustrated by dotted line 122A. As a result, it is thus possible to utilize the light from light sources 109 which is not emitted directly towards and collected by the lenslets 113.

For instance, the phosphor based LED may emit white light having a broad banded spectrum, where a part of the pumping light is transmitted through the converging material and part of the pumping light is converted into light with longer wavelengths. The retro-reflector 119 can in such embodiments be configured to reflect the broad banded light back to the converting material of the phosphor LED where the light having a short wavelength can be used to pump the converting material and thereby generate more of the light having long wavelength, which then can be emitted through the lenslet 113 and thus increase the light output of the illumination device 100. The long-waved light that are reflected back by the retro-reflector 119 will be scattered by the converting material in diffused directions and thus a part of the back reflected light will be emitted towards the lenslet 113. As a consequence, more light can be emitted by the illumination device 100. The retro-reflector 119 can also be configured to reflect certain wavelengths and transmit other wavelengths, for instance a dichroic filter configured to reflect the pumping light back to the converting material in order to convert more light while transmitting other wavelengths.

The retro-reflector 119 can be provided as any material capable of reflecting at least a part of the light emitted by the light source 109, for instance, metal structures, optical components configured to utilize internal reflection, structures provided with reflective coatings, etc.

Additionally, the illumination device 100 makes it possible to use phosphor based LEDs generating a white light having a cold color temperature, where a larger amount of the emitted light lies within the blue region, but where the output of the illumination device 100 emits a light having a warmer color temperature. This is possible as some of the light in the blue part of the spectrum that is reflected back by the retro-reflector 119 to the converting material will be converted into light having longer wavelengths which is emitted in the forward direction and collected by the lenslets 113. As a consequence, the relative amount of light in the green/red region of the spectrum is increased for the outgoing light beam 117. The white LEDs having a cold color temperature often provides more light output than similar white LED providing light having a warmer color temperature, as a consequence, it is possible to increase the overall light effect of the light fixture while having light with a warmer color temperature, which is often desired in the entertainment lighting industry.

FIG. 1C illustrates a front view of the light source module 101 and illustrates that the retro-reflector are provided as three ring shaped retro-reflectors 119A, 119B, 119C, where retro-reflector 119A is configured to reflect light from the outer most light sources, retro-reflector 119B is configured to reflect light from the light sources in the middle, and retro-reflector 119C is configured to reflect light from the central light source. The ring-shaped outer 119A and middle 119B retro-reflectors can both reflects light back to the same light source as illustrated by light ray 121A and reflect light back to another one of the light sources as illustrated by light rays 121B, 121C, 121D. Light ray 121B is reflected back onto the neighboring light source, light ray 121C is reflected back to the light source next the neighboring light source and light ray 121D is reflected back to the light source three positions from the light source originally generating the light. Similarly, the middle retro-reflector 119B can also be configured to reflect light from one of the middle light sources back to another of the middle light sources. The center retro-reflector 119C surrounds the center light source and is configured to reflect most of the light back the center light source. It is noticed that only the light rays below the light collector have been illustrated and that the light rays emitted through the light collector have not been shown.

FIG. 2 illustrates a front view of another embodiment of a light source module 201 which can be used in the illumination device of FIGS. 1A-1C. The light source module is similar to the light source module illustrated in FIGS. 1A-1C and similar element are labeled with the same reference numbers as in FIGS. 1A-1C and will not be describe further. In this embodiment, the retro-reflector 219A, 219B, 219C comprises a plurality of retro-reflector parts 223A-E and each reflector part 223A-E is configured to receive light from one of the light sources and to reflect the light back to the converting material of the same light source 109. In this embodiment, the retro-reflector parts 223A-E are formed as partial rings surrounding a corresponding light source. Each retro-reflector part 223A-E receives, as a consequence, a relatively large amount of light from a corresponding light source 109 and reflects the light back to the same light source 109. The outer retro-reflector 219A comprises a plurality of retro-reflector parts 223A facing the outer light sources 109 and each of the retro-reflector parts 223A reflects light back to the same outer light source 109 as illustrated by light rays 221A.

The middle retro-reflector 219B comprises a plurality of retro-reflector parts 223B facing the outer light sources 109 and each of the retro-reflector parts 223A-E reflects light back to the same outer light source 109 as illustrated by light rays 221B. The middle-retro reflector comprises a plurality of retro-reflector parts 223C facing the middle light sources and each of the retro-reflector parts 223C reflects light back to the same middle light source as illustrated by light ray 221C.

The inner retro-reflector 219C comprises a plurality of retro-reflector parts 223D facing the middle light sources and each of the retro-reflector parts 223D reflects light back to the same middle light source as illustrated by light ray 221D. Also, the center retro-reflector 219C comprises a retro-reflector part 223E surrounding the center central light source and the retro-reflector part 223E reflects light back to the center light source as illustrated by light ray 221E.

Providing the retro-reflector with retro-reflector parts 223A-E that are configured to receive light from one of the light sources 109 and to reflect the light back to the same light source 109 makes it possible to collect a larger amount of the light which is not emitted through the lenslets 113 as the retro-reflector parts 223A-E can be arranged closed to the light sources 109 whereby it is easier to collect and direct a larger part of the light back to the light source 109.

FIGS. 3A-3C illustrate an exemplary embodiment of a light source module 301 according to the present invention, where FIG. 3A illustrates a structural cross sectional view; FIG. 3B illustrates an enlarged view of the topmost lenslet; and FIG. 3C illustrates a front view. The light source module 301 is similar to the light source module 101 illustrated in FIGS. 1A-1C and can be used in the illumination device 100 illustrated in FIGS. 1A. Similar elements are labeled with the same reference numbers as in FIGS. 1A-1C and will not be described further.

In this embodiment, the retro-reflector comprises a plurality of ring shaped retro-reflectors 325 where each of the ring-shaped retro-reflector parts surrounds a corresponding light source 109. The reflecting surface of the ring-shaped reflector is formed as a spherical part facing the light source 109. The spherical part is formed as a part of a sphere and arranged such that the light source 109 is positioned at the center formed by the sphere. As a consequence, the light emitted by each light source 109 that hits the spherical part of the retro-reflector will be reflected back towards the light source 109 as illustrated by dotted light ray 321. A corresponding lenslet 113 is arranged in or above an opening in the ring-shaped retro-reflector such that light passing through the opening enters the entrance surface 114 of the lenslet 113. In the illustrated embodiment, the ring-shaped retro-reflectors 325 are provided as individual retro-reflectors, however it is to be understood that some or all of the ring-shaped retro-reflectors 325 also can be integrated into a common retro-reflector body. A common retro-reflector body makes it easier to manufacture the illumination device as the plurality of ring shaped retro-reflectors easier can be arranged and properly aligned with the light sources 109 and lenslets 113.

FIGS. 4A-4C illustrate an exemplary embodiment of a light source module 401 according to the present invention, where FIG. 4A illustrates a structural cross sectional view; FIG. 4B illustrates an enlarged view of the topmost lenslet; FIG. 4C illustrates a front view. The light source module 401 is similar to the light source module illustrated in FIGS. 3A-3C and can be used in the illumination device 100 illustrated in FIGS. 1A. Similar elements are labeled with the same reference numbers as in FIGS. 1A-1C, 3A-3C and will not be described further. In this embodiment, the lenslets 413 are arranged at different axial distances in relation to the light source and angled differently in relation to the optical axis, for instance as described in EP2881653.

Like in the embodiment shown in FIG. 3A-C, the retro reflector comprises a plurality of ring shaped retro-reflectors 425 where each of the ring-shaped retro-reflectors 425 surrounds a corresponding light source 109. The reflecting surface of the ring-shaped retro-reflector 425 is formed as a spherical part facing the light source 109. Where the spherical part is formed as at least a part of a sphere arranged such at the light source 109 is positioned at the center formed by the sphere. In the illustrated embodiment, the ring-shaped retro-reflector 425 is formed as a semi-sphere where a top part of the sphere is removed/omitted and thereby forming an opening in the top. A corresponding lenslet 413 is arranged in or above an opening in the ring-shaped retro-reflector 425 such that light passing through the opening enters the entrance surface 414 of the lenslet 413 whereafter it leaves the lenslet 413 through the exit surface 416. As a consequence, the light emitted by each light source 109 that hits the spherical retro-reflector 425 will be reflected back towards the light source 109 as illustrated by dotted light ray 421.

The ring shape retro-reflector 425 associated with an angled lenslet 413 are thus asymmetrically in order to receive as much of the light from the light source 109 as possible. The outer lenslets 413 are more angled than the inner lenslets 413 and as a consequence less light is emitted directly from the light source 109 to the lenslet 413 and the corresponding ring shaped retro-reflectors 425 make it possible to utilize a larger part of the light from the light source 109. In the illustrated embodiment, the ring shaped retro reflectors 425 are provided as individual retro-reflectors; however it is to be understood that some or all of the ring shaped retro-reflectors 425 also can be integrated into a common retro-reflector body.

Additionally, in the illustrated embodiment, the ring-shaped retro-reflector 425 have different sizes and the radius of the different spherical shaped retro-reflector parts have different radius. This makes it possible to adjust the size of the retro-reflectors 425 according to the corresponding light source 109 and lenslet 413, for instance, in order to optimize the pattern of the retro-reflectors 425.

Figure 5A:
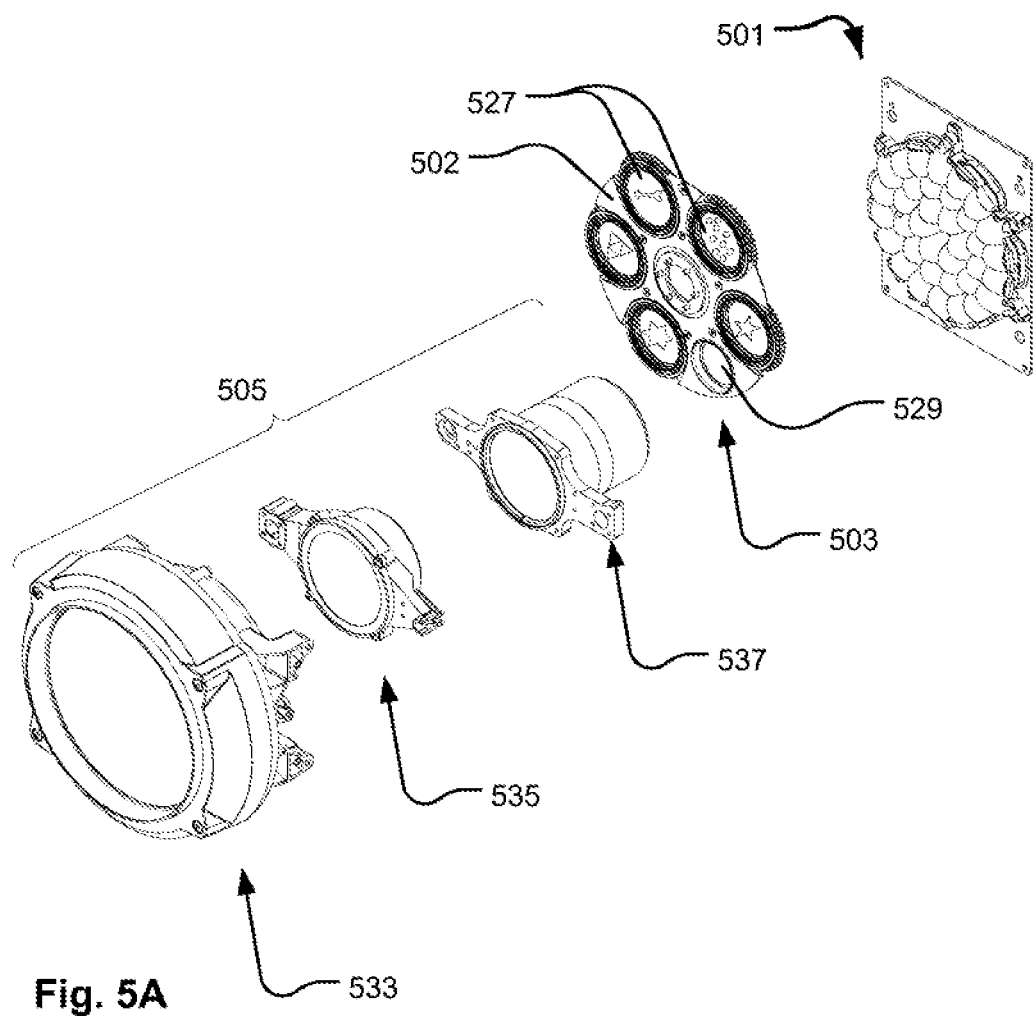
FIGS. 5A-5B illustrate an entertainment light fixture comprising a plurality of light sources, a light collector, a retro-reflector, an optical gate and a projecting system.
Figure 5B:
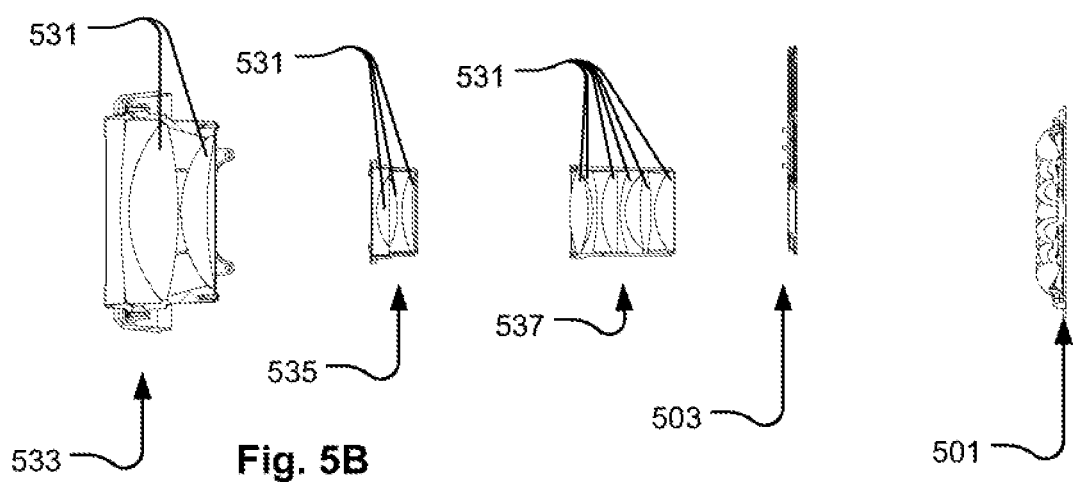

FIGS. 5A and 5B illustrate an illumination device in the form of an entertainment light fixture. FIG. 5A illustrates a front perspective view of the illumination device and FIG. 5B illustrates a structural cross sectional view. The entertainment light fixture comprises a light source module 501, a gobo wheel 502 forming an optical gate 503, and a projecting system 505 configured to image the gobos onto a target surface. The light source module 501 will be described in connection with FIGS. 6A-6H and will not be describe further in connection with FIGS. 5A-5B.

The gobo wheel 502 comprises a number of gobos 527 mounted on a rotating carousel as known in the art of entertainment lighting and an open aperture 529 for allowing the light to pass un-influenced. The gobo wheel 502 can for instance be embodied as described in U.S. Pat. No. 5,402,326, U.S. Pat. No. 6,601,973, U.S. Pat. No. 6,687,063 or US2009/0122548. Each gobo 527 can be moved into the optical gate by rotating the gobo wheel 502.

The projecting system 505 is adapted to create an image of the gobo 527 at a target surface (not shown) and comprises a number of optical lenses 531 for instance arrange in a group of front lenses 533, a group of zoom lenses 535, and a group of focus lenses 537. The group of zoom lenses 535 and group of focus lenses 537 can be moved in relation to the group of front lenses 533 and the aperture, as known in the art of projecting systems. It is noticed that the front, zoom, and/or focus groups 533, 535, and 537, respectively, can be formed as a single lens or comprise any number of lenses.

The illustrated entertainment light fixture can also comprise a color wheel comprising a number of optical filters (e.g., dichroic filters, color gels or the like) which can also be positioned into the light beam. The color wheel is useful in the case that the light sources produce a white light beam and can be used to create a certain color of the light beam. Graduated color filters which gradually change the color of the light beam can also be used, for instance, in connection with the known CMY color mixing systems. The color wheel is, however, optional, as it can be omitted in the case where the light sources are of different colors and adapted to perform additive color mixing as known in the art of dynamic lighting. This is for instance possible by having a number of red, green and blue LEDs where the color mixing is based on an intensity of the different colors. The intensity of the different colors can, for instance, be controlled by the commonly known pulse width modulation (PWM) method, or by adjusting the DC current through each color LED. Also the person skilled in entertainment light fixtures realizes that a number of light effects can be integrated into the light fixture, for instance, prism effects, iris effects, framing effects, frost effects, dimming effects, animation effects, additional gobo wheels etc. The entertainment fixture can be controlled based on an input signal indicative of light parameters which can be indicative of a target color indicating a decried color of the outgoing light, a number of light effect parameters indicative of a various numbers of light effects. The entertainment light fixture may comprise a processor (not shown) configured to control the different light effect of the light fixture based on the light parameters received by the input signal. For instance, the entertainment light fixture may comprise the light effects and be controlled based on various parameters as described in WO2010/145658 in particular on page 4 line 11-page 6 line 9.

Figure 6A:
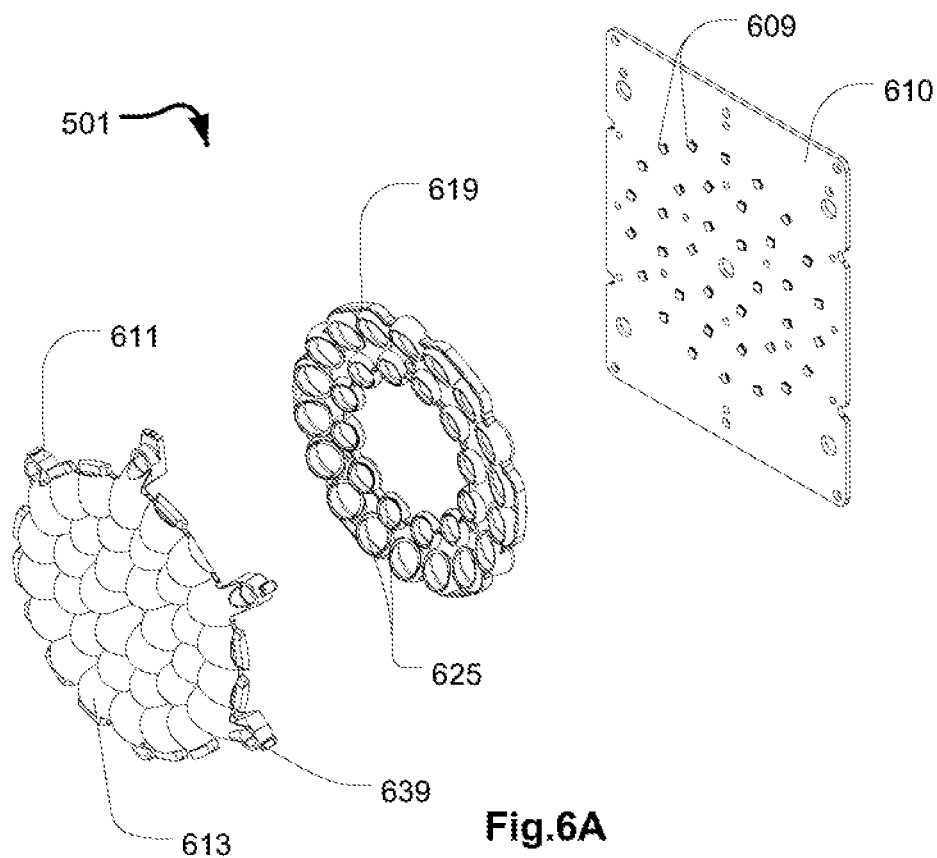
Figure 6B:
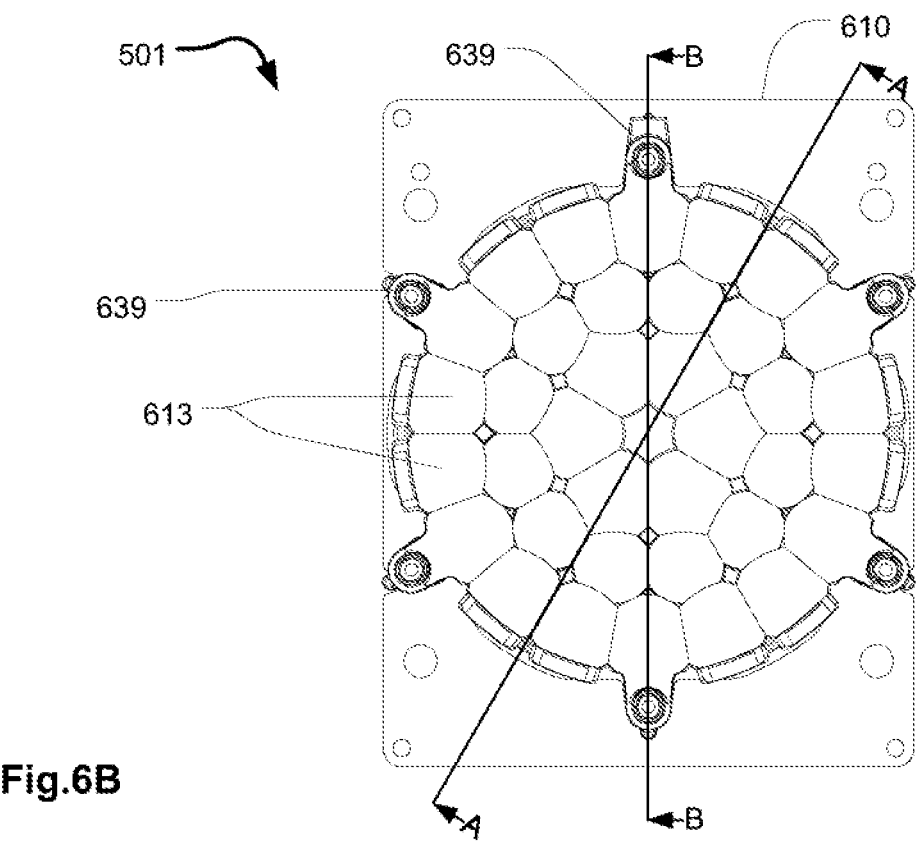
Figure 6C:
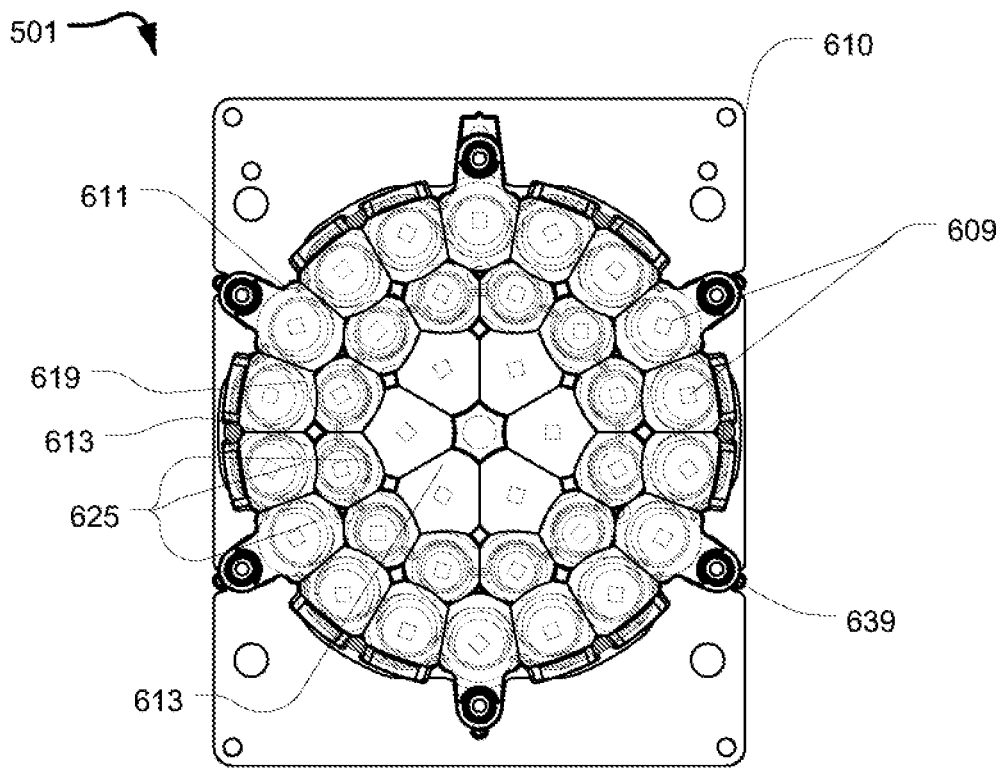
Figure 6D:
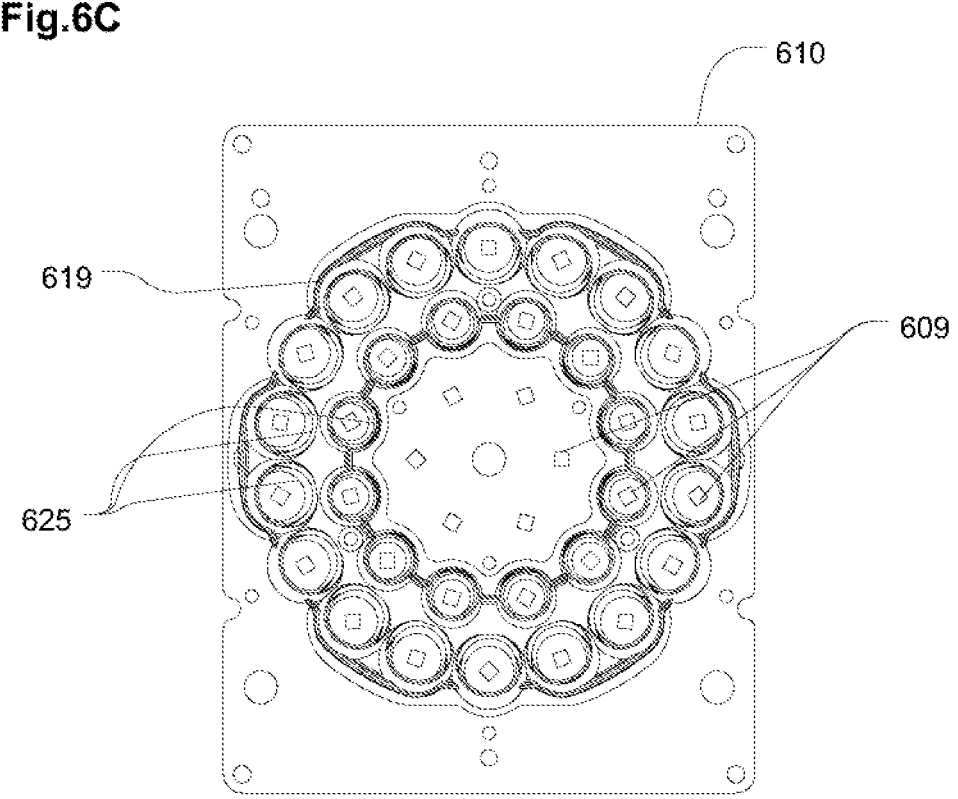

FIGS. 6A-6H illustrate the light source module 501 of the entertainment light fixture of FIG. 5A-5B; where FIG. 6A illustrates an exploded perspective view, FIG. 6B is a front view, FIG. 6C is a front view where the retro-reflector has been illustrated below the light collector in dotted lines; FIG. 6D is a front view with the light collector removed; FIG. 6E is a cross sectional view of the light source module through line A-A of 6B, FIG. 6F is an exploded cross-sectional view of the light source module through line A-A of 6B; FIG. 6G is a cross sectional view of the light source module through line B-B of 6B, and FIG. 6H is an exploded cross sectional view of the light source module through line B-B of FIG. 6B.

The light source module 501 comprises a mounting plate 610 whereon a LED PCB is arranged (not shown) and the light sources 609 are mounted on the PCB. The light sources 609 are provided as white phosphor based LEDs.

A light collector 611 comprising 36 lenslets 613 is arranged above the light sources 509 and is attached to the mounting plate 610 through a number of attaching points 639 using fasteners (not shown) such as screws or the like. Some of the lenslets 613 are angled differently in relation the optical axis and at different axial distances to the light sources 609, for instance, using the principles as described in EP2881653. Further, the lenslets 613 are integrated into one common light collector body and arranged in a dense circular pattern for instance as described in EP2881653.

A retro-reflector 619 is arranged between the light sources 609 and the light collector 611 and the retro-reflector comprise a plurality of ring shaped spherical retro-reflectors 625 which is integrated into one common retro-reflector body. The ring shaped spherical retro-reflectors 619 are configured to receive a part of the light emitted by the light sources 609 and reflect the light back to the converting material of the light sources 609 as described above, as a consequence, more light can be emitted by the light fixture. The light collector 611 comprises 30 ring shaped spherical retro-reflectors which are arranged below the middle and outermost lenslets 613 and thus collect light from the middle and outermost light sources 609. It is noticed that the ring shape spherical retro-reflectors 625 also can be provided for the central light sources 609 and lenslets 613. However, in this embodiment, they have been omitted as the space between the center lenslets and the center light sources are limited and there is not much space for retro-reflectors. The ring shaped spherical retro-reflectors 625 are formed such that the opening of the ring shaped spherical retro-reflectors 625 are arranged below the corresponding lenslet 613, and as a consequence, the ring shaped spherical retro-reflector 625 receives most of the light from the light source 109 and that is not emitted directly to the lenslet 613.

The illumination device according to the present invention thus increases the optical efficiency of the outgoing light by recycling the light that is not collected by the lenslets. The uneven color distribution across the emitting surface of phosphor-based LEDs are reduced as the light reflected back to the converting material by the retro-reflector can hit various areas of the converting material and thus compensate for this. An additional advantage is the fact that stray light generated by the light source module can be reduced, as the stray light primarily is caused by the light not collected by the optical system (lenslets and optical projecting system. The retro-reflector prevents stray light by recycling it into the optical system.

What is claimed is:

1. An illumination device comprising:
   a plurality of light sources emitting light along an optical axis, and the plurality of light sources including a converting material capable of converting light into other wavelengths;
   an optical gate arranged along the optical axis;
   a light collector arranged between the plurality of light sources and the optical gate, the light collector is adapted to collect light from the plurality of light sources, wherein the light collector comprises a plurality of lenslets adapted to collect light from the plurality of light sources and adapted to convert the collected light into a plurality of light beams to propagate along the optical axis and through the optical gate, where each of the plurality of lenslets comprise an entrance surface where the light enters a lenslet of the plurality of lenslets and an exit surface where the light exits the lenslet; and an optical projecting system adapted to collect at least a part of the plurality of light beams and adapted to project at least a part of the light along the optical axis;

wherein the illumination device comprises a retro-reflector arranged between the light collector and the plurality of light sources, the retro-reflector is configured to receive at least a part of the light emitted by the plurality of light sources and to reflect at least a part of the received light back to the converting material of at least one light source of the plurality of light sources.

2. The illumination device according to claim 1, wherein the retro-reflector comprises a spherical part formed as at least a part of a sphere.

3. The illumination device according to claim 2, wherein the at least one light source of the plurality of light sources is arranged at a center formed by the spherical part.

4. The illumination device according to claim 1, wherein the retro-reflector comprises a ring-shaped retro-reflector arranged around one light source of the plurality of light sources and arranged such that the entrance surface of the lenslet is arranged in or above an opening of the ring-shaped retro-reflector.

5. The illumination device according to claim 4, wherein the ring-shaped retro-reflector is formed as a semi-sphere where the opening is formed at a top part of the semi-sphere.

6. The illumination device according to claim 4, wherein the lenslet is angled in relation to the at least one light source and the ring-shaped retro-reflector is asymmetric.

7. The illumination device according to claim 4, wherein the ring-shaped retro-reflector is integrated into one common retro-reflector body.

8. The illumination device according to claim 4, wherein the illumination device comprises a plurality of said ring-shaped retro-reflectors and each of the ring-shaped retro-reflectors is associated with a corresponding light source and a corresponding lenslet.

9. The illumination device according to claim 1, wherein the retro-reflector comprises a plurality of retro-reflector parts, where each of the plurality of reflector parts is configured to receive light from one of the plurality of light sources and to reflect the received light back to the converting material of a same light source.

10. The illumination device according to claim 1, wherein at least one of the plurality of light sources is a phosphor based white LED.

11. The illumination device according to claim 1, wherein the illumination device comprises a plurality of ring-shaped retro-reflectors and each of the ring-shaped retro-reflectors is associated with a corresponding light source and a corresponding lenslet, and wherein the ring-shaped retro-reflector surrounds the corresponding light source and the corresponding lenslet is arranged in or above and opening of said ring-shaped retro-reflector.

12. The illumination device according to claim 11, wherein the ring-shaped retro-reflector comprises a spherical reflector part and the corresponding light source is arranged at a center formed by the spherical reflector part.

13. An entertainment light fixture comprising:
at least one light source of the plurality of light sources emitting light through the optical gate; wherein the optical projecting system is adapted to collect at least a part of the light emitted through the optical gate and to project at least a part of the light along an optical axis;
at least one light effect component arranged in the light; and
a processor configured to control the entertainment light fixture based on an input signal indicative of at least one light parameter;
wherein the at least one light source, the optical gate, and the optical projecting system are configured as an illumination device according to claim 1.

14. The entertainment light fixture according to claim 13 wherein the at least one light effect component is a GOBO arranged near said optical gate.

* * * * *